United States Patent
Noguchi et al.

(10) Patent No.: US 6,502,324 B2
(45) Date of Patent: Jan. 7, 2003

(54) METHOD OF ALIGNMENT BETWEEN SHEET MATERIALS, METHOD OF ALIGNMENT, SUBSTRATE ASSEMBLING METHOD AND ALIGNING APPARATUS

(75) Inventors: Michikazu Noguchi, Kanagawa (JP); Tsuneo Heitoh, Shiga (JP); Evan George Colgan, Chestnut Ridge, NY (US); Masaru Suzuki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 09/735,038

(22) Filed: Dec. 12, 2000

(65) Prior Publication Data

US 2002/0069550 A1 Jun. 13, 2002

(51) Int. Cl.$^7$ .................. G01D 21/00; G01N 23/00; G01B 11/00
(52) U.S. Cl. .................. 33/623; 33/645; 250/491.1; 356/401
(58) Field of Search .................. 33/613, 286, 645, 33/623, 533; 250/491.1; 356/399, 401, 400; 349/191

(56) References Cited

U.S. PATENT DOCUMENTS

| | | | | |
|---|---|---|---|---|
| 4,225,241 A | * | 9/1980 | Dandliker et al. | 356/400 |
| 4,588,899 A | * | 5/1986 | Erhardt | 250/491.1 |
| 4,814,626 A | * | 3/1989 | Doemens et al. | 250/561 |
| 4,924,356 A | * | 5/1990 | French et al. | 362/31 |
| 5,101,279 A | * | 3/1992 | Kurematsu et al. | 358/241 |
| 5,298,988 A | * | 3/1994 | Everett et al. | 348/87 |
| 5,633,719 A | * | 5/1997 | Oehlbeck et al. | 356/401 |
| 5,689,340 A | * | 11/1997 | Young | 356/401 |
| 6,204,895 B1 | * | 3/2001 | Nakamura et al. | 349/5 |
| 6,362,883 B1 | * | 3/2002 | Watkins | 356/399 |

FOREIGN PATENT DOCUMENTS

| | | | | |
|---|---|---|---|---|
| JP | 09244266 A | * | 9/1997 | G03F/9/00 |
| JP | 2001305519 A | * | 10/2001 | G02F/1/13 |

* cited by examiner

Primary Examiner—Diego Gutierrez
Assistant Examiner—Mirellys Jagan
(74) Attorney, Agent, or Firm—Scully, Scott, Murphy & Presser; Marian Underweiser, Esq.

(57) ABSTRACT

The present invention provides a method of alignment between sheet materials, a method of alignment, a substrate assembling method, and an aligning apparatus, which are capable of easily and surely performing highly accurate alignment and suppressing a reduction in material yield.

After alignment performed based on a band-like light as a reference, alignment is performed based on a joint of a condenser lens portion of a lenticular lens as a reference. More specifically, the deviation of a liquid crystal display cell in a rotational direction is corrected by using a light emitted from a light source and condensed to be band-like at the lenticular lens as a reference. Subsequently, by changing a depth of focus of a microscope, measurement is performed for positions of a black matrix of the liquid crystal display cell and the joint of the condenser lens portion of the lenticular lens. Then, based on the result of the measurement, horizontal alignment is performed between the liquid crystal display cell and the lenticular lens.

15 Claims, 13 Drawing Sheets

(a)

(b)

METHOD OF ALIGNMENT BETWEEN SHEET MATERIALS, METHOD OF ALIGNMENT, SUBSTRATE ASSEMBLING METHOD AND ALIGNING APPARATUS

BACKGROUND OF THE INVENTION

1. Technical Field

The present invention relates to a method of alignment between sheet materials, which is suitably used for alignment, for example between a liquid crystal display cell and a lenticular lens, which constitute a liquid crystal display panel, a method of alignment, a substrate assembling method and an aligning apparatus.

2. Prior Art

There has been a remarkable progress in the popularization of a liquid crystal display device as an image display device used for a monitor of a personal computer and various other monitors. The liquid crystal display of this type is generally constructed in such a manner that a backlight as a sheet light source for illumination is disposed on the backside of a display panel, a liquid crystal surface having a given extent is illuminated to have uniform brightness as a whole, and thus an image formed on the liquid crystal display surface of the display panel can be visible.

The conventionally used display panel includes signal and gate lines, a TFT having an amorphous silicon layer or the like formed thereon, a color filter, and so on, all of which are laminated between two glass substrates. In such a display panel, a light emitted from the backlight is dispersed into three colors of R (Red), G(Green) and B (Blue) by the color filter to form a pixel of each of R, G and B colors.

Especially, in a projection type liquid crystal display device, the quantity of transmitted lights is increased by condensing incident lights using the lenticular lens and converging the lights to the opening portion of the pixel. The example thereof is described in Japanese Patent Laid-Open No. Hei 3-244286.

In recent years, as a technology for removing filters from the display panel, the display panel using the lenticular lens has been developed.

FIG. 12 schematically shows the structure of such a display panel using the lenticular lens. In FIG. 12, a reference numeral 1 denotes a liquid crystal display cell; and 2 a lenticular lens.

The liquid crystal display cell 1 includes a liquid crystal sealed in between two glass substrates 3A and 3B, a signal line 4s, a gate line (not shown), a TFT device, a display electrode, and so on. In the glass substrate 3A, a black matrix 5 is formed to cover the signal line 4s and the gate line.

The lenticular lens 2 includes a number of arrayed condenser lens portions 7 formed to be roughly circular-arc in section. As shown in FIGS. 12 and 13, the roughly circular-arc section of each of the condenser lens portions 7 is formed to be continuous in the extended direction of the signal line 4s. Each condenser lens portion 7 is formed such that in the width direction thereof, totally three opening portions 8 can be positioned between joints 7a and 7a of the other condenser lens portions 7 arrayed in both sides thereof, each opening portion 8 being defined by a black matrix 5 and forming one pixel.

In such a display panel having the lenticular lens 2, a light emitted from the backlight unit (not shown) as a light source is dispersed into three colors of R, G and B by a diffraction grating provided in the backlight unit, and the dispersed lights are made incident on the lenticular lens 2. In this case, the incident angles of the dispersed lights are different from one another for each color, and each dispersed light is parallel rays of light. Thus, the light of each color condensed at the condenser lens portion 7 of the lenticular lens 2 forms an image at each of the three opening portions 8 arrayed between the joints 7a and 7a. As a result, the pixels of three colors, R, G and B are formed side by side in the width direction of each condenser lens portion 7.

In the manufacturing process of such a display panel, in order to accurately align the position of each color image (light) formed by the light condensed at the condenser lens portion 7 of the lenticular lens 2 with the position of each opening portion 8 formed in the glass substrate 3A, alignment must be performed between the lenticular lens 2 and the liquid crystal display cell 1.

For the purpose of performing alignment between the lenticular lens 2 and the liquid crystal display cell 1, technologies have already been disclosed in Japanese Patent Laid-Open No. Hei 8-211515 and Japanese Patent Laid-Open No. Hei 9-113215. According to the technology disclosed in Japanese Patent Laid-Open No. Hei 8-211515, a mark for alignment is formed in the lenticular lens 2 or a substrate of the opposite side thereof (liquid crystal display cell 1), and alignment is performed by using this mark. According to Japanese Patent Laid-Open No. Hei 9-113215, a "planar area" not roughly circular-arc in section is formed in the lenticular lens 2, and alignment is performed by viewing this planar area through a microscope.

However, in the foregoing conventional technologies, the mark for alignment must be provided in the lenticular lens 2 or the substrate, and the planar area must be formed in the lenticular lens 2. Thus, extra time and labor for forming such a mark or a planar area were necessary.

In its manufacturing process, the lenticular lens 2 is cut out in a specified size from a web continuous in the extended direction of the condenser lens portion 7 roughly circular-arc in section. At this time, the mark for alignment or the planar area is formed in this web manufacturing stage. If the mark for alignment or the planar area is formed beforehand in the web, the position of cutting the lenticular lens 2 out of the web is decided. Thus, if some defective spots are found, the position of cutting-out cannot be shifted, thus reducing yield.

Furthermore, the lenticular lens 2 and the liquid crystal display cell I must be stuck to each other with accuracy of, e.g., 25 $\mu$m in order to prevent an image quality problem. However, for the lenticular lens 2 itself, the accuracy of pitches for the condenser lens portions 7 is set equal to 20 $\mu$m in the manufacturing process. Thus, for this sticking, alignment between the lenticular lens 2 and the liquid crystal display cell 1 must be performed with very high accuracy of 5 $\mu$m.

SUMMARY OF THE INVENTION

The present invention was made with the foregoing technical problems in mind, and the object of the present invention is to provide a method of alignment between sheet materials, a method of alignment, a substrate assembling method, and an aligning apparatus, which are capable of easily and surely performing highly accurate alignment and suppressing a reduction in material yield.

In order to achieve the foregoing object, according to the present invention, a method of alignment between sheet materials comprises the steps of: setting a focus of a microscope on a first sheet material in the laminated state of first and second sheet materials to perform measurement for a position of a specified portion of the first sheet material, setting the focus of the microscope on the second sheet material to perform measurement for a position of a specified portion of the second sheet material; and performing alignment between the first and second sheet materials based on the measured positions of the first and second sheet materials.

By changing the focus of the microscope in the laminated state of the first and second sheet materials, the positions of the first and second sheet materials based on the microscope as a reference can be respectively understood.

In this case, the second sheet material may be transmissive or non-transmissive. However, brightness necessary for the position measurement at the microscope must be secured. Any order for the measurements of the specified portions of the first and second sheet materials can be employed.

If the second sheet material is a lens sheet having a plurality of lens portions arrayed side by side, the position of the lens sheet is measured at the joint of the lens portions adjacent to each other. The joint of the lens portions is sufficiently thin compared with a signal line or a gate line and, by performing alignment using this joint, highly accurate alignment can be realized.

If the first sheet material is a liquid crystal display cell including signal and gate lines and a black matrix disposed in a matrix shape, the position of the liquid crystal display cell can be measured based on the signal line, the gate line or the black matrix. In this case, the accuracy of alignment can be increased by measuring a position of a centerline in the width direction of the signal line, the gate line or the black matrix, and matching the centerline with the joint of the lens portions.

Further, by measuring the positions of the first and second sheet materials at a plurality of places, if the second sheet material is deviated with an angle from the first sheet material (deviated in a rotational direction), the quantity of the deviation can be measured, and alignment can be performed based on the measured quantity of the deviation.

According to the method of alignment of the present invention, a reference light is made incident on the glass substrate and the lens sheet laminated together from the lens sheet side, and the glass substrate is aligned relative to the reference light passed through the lens sheet. In this case, the reference light should preferably be parallel rays of light. In addition, the reference light should more preferably be condensed at the lens sheet, and projected as a band-like light to the glass substrate. If the reference light is made incident on the glass substrate from a direction roughly orthogonal to the same, the position of the reference light projected on the glass substrate can be easily specified.

Accordingly, since the reference light passed through the lens sheet forms an image on the glass substrate in the state of being condensed or dispersed by the lens sheet, the position of the image on the glass substrate is decided by the lens sheet. Thus, by aligning the glass substrate with the image of the reference light, the glass substrate can be aligned with the lens sheet.

For example, if the glass substrate is a liquid crystal display cell, the non-transmission portion of the glass substrate, such as the black matrix, the signal line and the gate line, can be aligned relative to the reference light.

According to the present invention, a method of alignment comprises: a first step of making parallel rays of light incident from a lenticular lens side in a laminated state of a liquid crystal display cell and the lenticular lens, and aligning the liquid crystal display cell relative to a band-like reference light obtained by condensing the parallel rays of light at one of the condenser lenses of the lenticular lens; a second step of performing measurement for a position of the wiring portion of the liquid crystal display cell by setting a focus of observing means on the liquid crystal display cell, and performing measurement for a joint of the condenser lenses by setting the focus of the observing means on the lenticular lens; and a third step of performing alignment between the liquid crystal display cell and the lenticular lens based on the measured positions of the wiring portion and the joint of the condenser lenses.

In the first step, deviation of the liquid crystal display cell in a rotational direction relative to the reference light may be corrected. In the third step, deviation between the lenticular lens and the liquid crystal display cell in a direction orthogonal to the extended direction of the condenser lens may be corrected.

In this case, a group of three pixels of R, G and B are arrayed in the liquid crystal cell. If one condenser lens of the lenticular lens is provided corresponding to the group of three pixels, alignment must be performed so as to prevent the condenser lens from being shifted by one or two pixels. In such a case, in the second step, the wiring portion such as a signal line corresponding to the group of three pixels can be specified by using a frame outside the display area of the liquid crystal display cell. Then, by performing measurement for the position of the specified wiring portion, the lenticular lens can be accurately aligned.

Alignment can also be performed between the liquid crystal display cell and the lenticular lens based on the centerline of the liquid crystal display cell as a reference by performing measurement for the positions of the wiring portion and the joint of the condenser lenses at two places spaced from each other with the centerline of the liquid crystal display cell held therebetween. Accordingly, compared with the case of alignment performed by using the end portion of the liquid crystal display cell as a reference, the effect of the manufacturing dimension error of the liquid crystal display cell or the lenticular lens can be limited. In this case, the centerline of the liquid crystal display cell means a line passing through the center of the surface (display area) of the liquid crystal displace cell like that shown in FIG. 1.

According to the present invention, a substrate assembling method comprises the steps of: laminating a glass substrate and a lens sheet by interpolating unhardened adhesive; performing measurement for positions of respective specified portions of the glass substrate and the lens sheet by changing a depth of focus at a microscope; performing alignment between the glass substrate and the lens sheet based on the result of the measurement; and hardening the adhesive.

Furthermore, according to the present invention, an aligning apparatus comprises: cell holding means; lens holding means; driving means for driving at least one of the cell and lens holding means; observing means capable of changing a depth of focus; position data obtaining means such as an image processor or the like for obtaining position data of the liquid crystal display cell and the lenticular lens based on an image obtained by the observing means; and control means for controlling the driving means based on the obtained position data. In addition, the aligning apparatus may further comprise a light source for emitting parallel rays of light to the lenticular lens.

The aligning apparatus further comprises: first observing means for measuring deviation between the liquid crystal display cell and the lenticular lens in a rotational direction; and second observing means for measuring deviation between the liquid crystal display cell and the lenticular lens in a direction orthogonal to a continuous direction of a lens portion. In addition, the second observing means can be disposed respectively in one and other end portions of the liquid crystal display cell.

BRIEF DESCRIPTION OF THE DRAWINGS

Preferred embodiments of the present invention will now be described, by way of example only, with reference to the accompanying drawings in which:

FIG. 8(b) showing an image focused on the lenticular lens.

FIG. 11(b) showing an image focused the on lenticular lens.

DETAILED DESCRIPTION OF THE PREFERRED EMBODIMENTS OF THE INVENTION

Next, the present invention will be described in detail with reference to first and second embodiments shown in the accompanying drawings.

Figure 12:
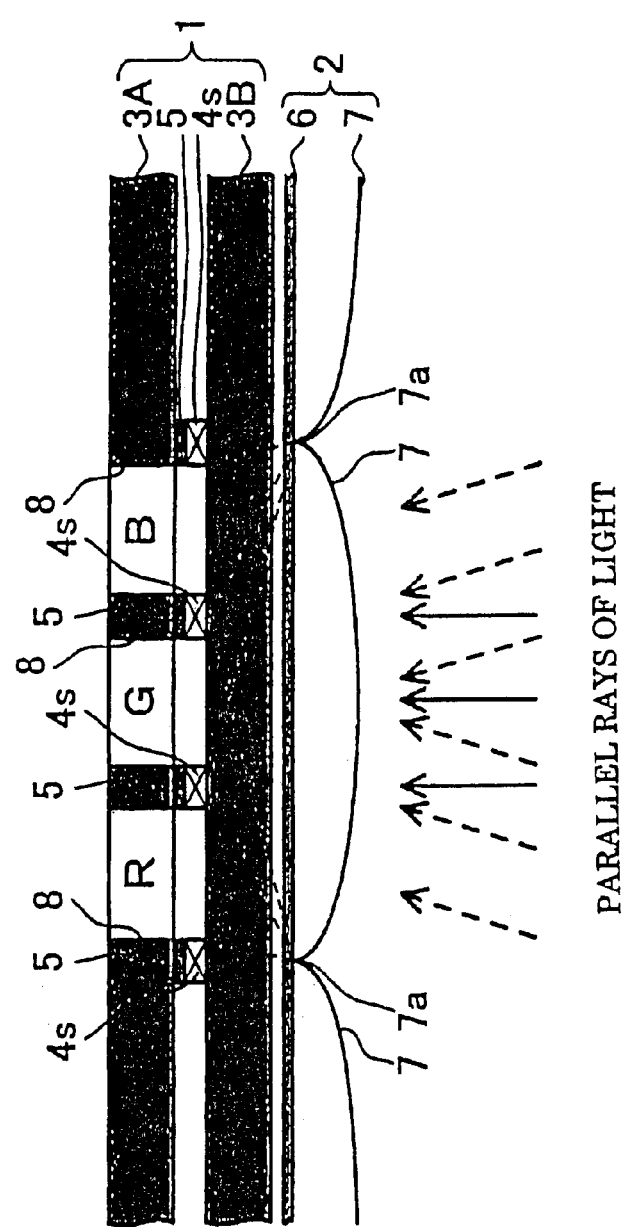
FIG. 12 is a sectional view schematically showing a structure of a display panel having the lenticular lens.
Figure 13:
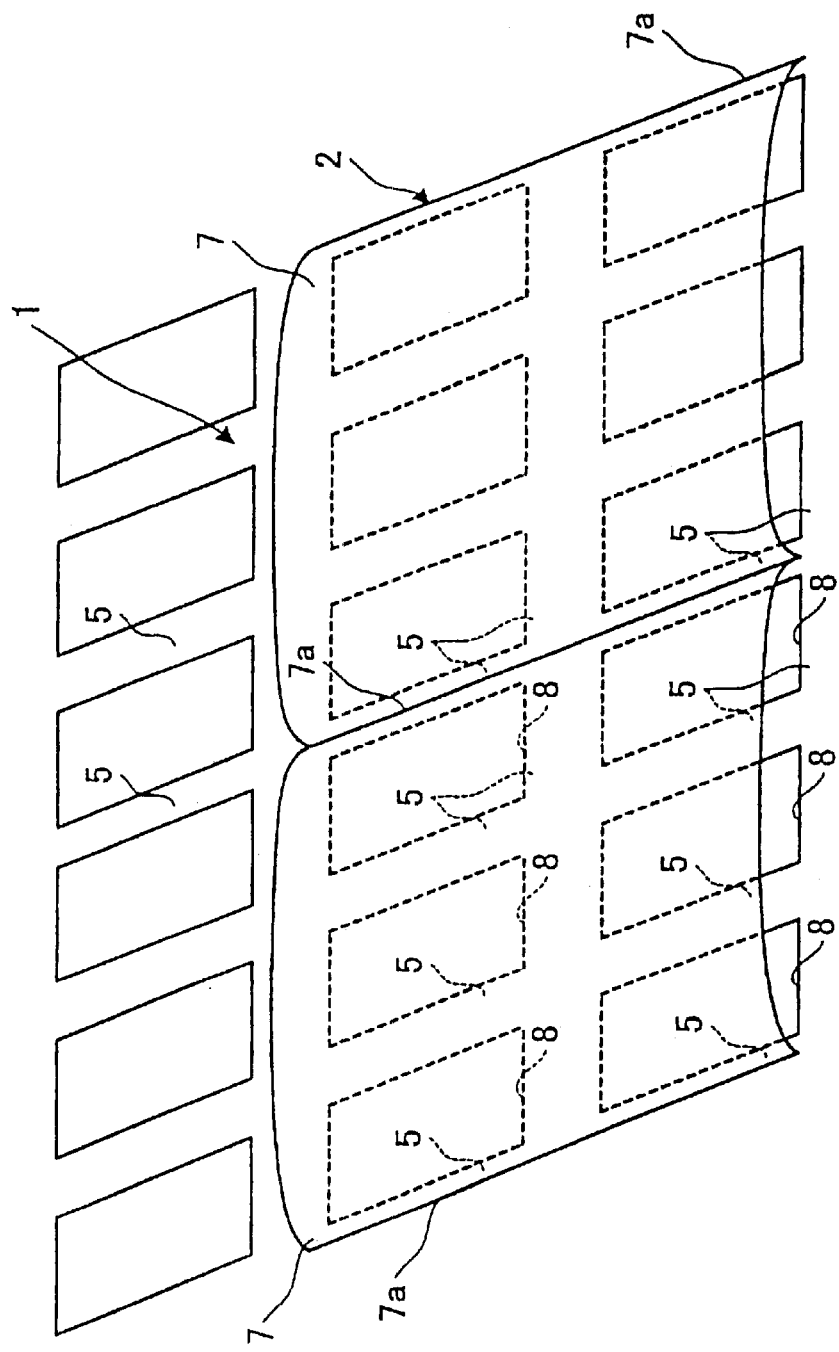
FIG. 13 is a perspective view showing a positional relation between the lenticular lens and the liquid crystal display cell.

First, the present invention is described by taking as an example the case of aligning a lenticular lens with a glass substrate by changing a depth of focus of a microscope. The constitution of a display panel provided with the lenticular lens and the glass substrate targeted for alignment is similar to that shown in FIGS. 12 and 13. Thus, like portions are denoted by like reference numerals, and explanation thereof will be omitted. In the description, it is assumed that the direction of the continuous condenser lens portion 7 of a lenticular lens 2 is set as a "vertical direction", and the direction of arraying condenser lens portions 7 side by side is set as a "horizontal direction".

Figure 1:
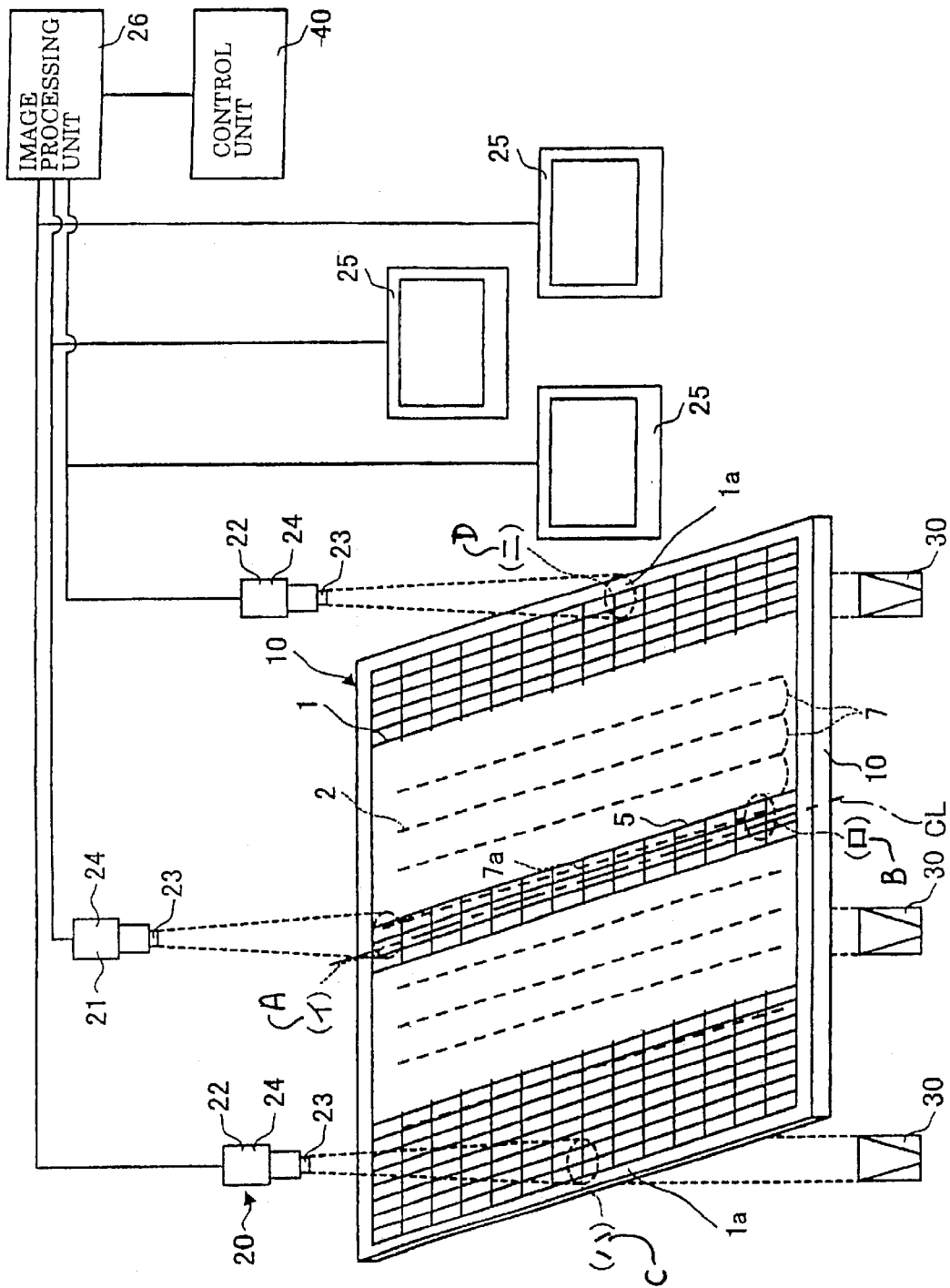
FIG. 1 is a view showing a system configuration of an aligning apparatus according to the embodiments.

FIG. 1 is a view illustrating a system configuration of an aligning apparatus according to the first embodiment. In FIG. 1, a reference numeral 10 denotes a stage unit for holding a lenticular lens (second sheet material, or lens sheet) 2 and a liquid crystal display cell (first sheet material, or glass substrate) 1, which are targeted for alignment; 20 a measuring unit for measuring the deviation of each of the lenticular lens 2 and the liquid crystal cell 1, which are held by the stage unit 10; 30 a light source; and 40 a control unit (control means) for controlling the stage unit 10 based on the result of observation made by the measuring unit 20.

Figure 2:
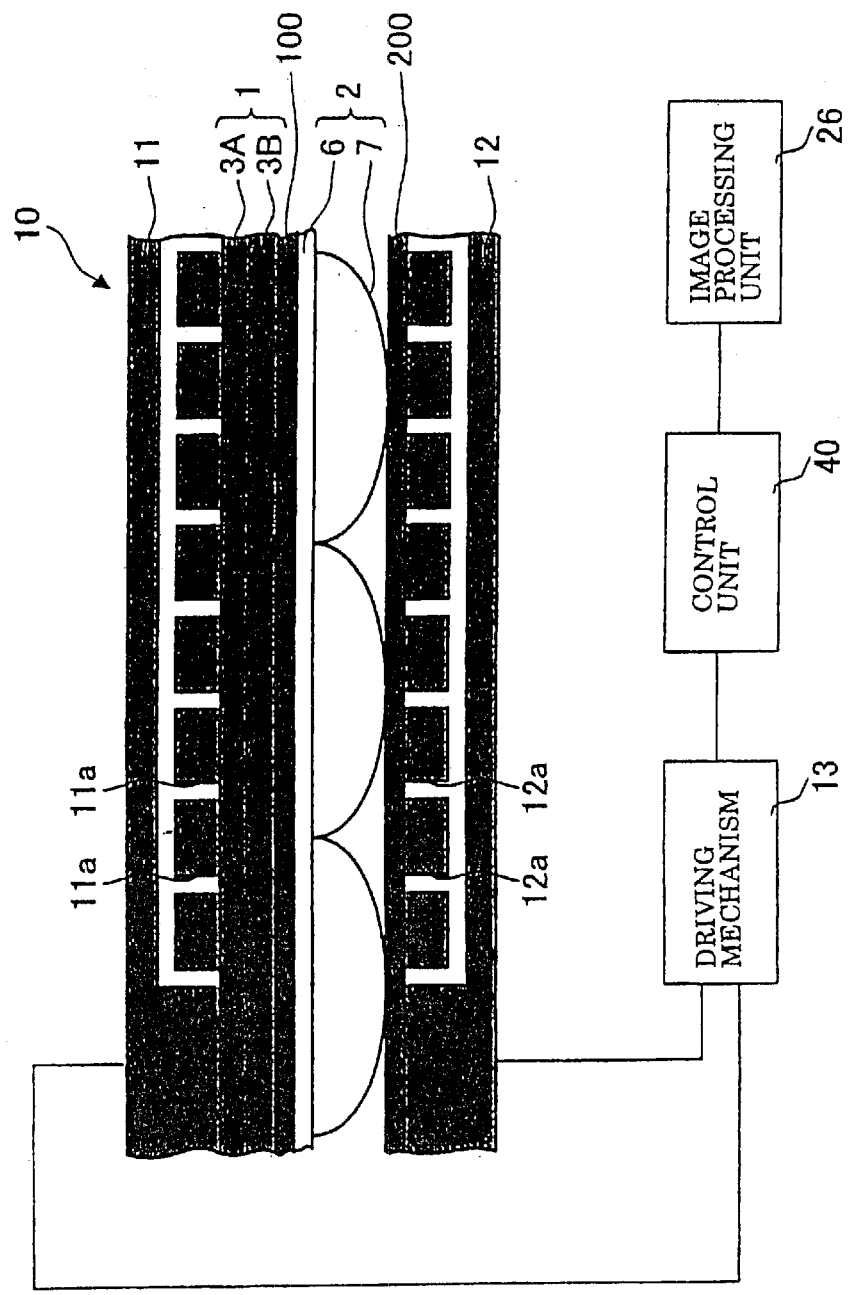
FIG. 2 is a sectional view showing a constitution of a stage unit of the aligning apparatus.

FIG. 2 is a view showing a constitution of the stage unit 10. The lenticular lens 2 and the liquid crystal display cell 1 are shown to be laminated in a state of sandwiching unhardened adhesive 100 of an ultraviolet ray hardening type, the lamination having been carried out in the previous step. A reference numeral 200 denotes a protective film, which was stuck to the condenser lens 7 in the manufacturing process of the lenticular lens 2.

The stage unit 10 includes a substrate holding stage 11 provided as cell holding means to hold a glass substrate 3A constituting the liquid crystal display cell 1, and a lens holding stage 12 provided as lens holding means to hold the lenticular lens 2. These substrate and lens holding stages 11 and 12 have adsorption holes 11a and 12a respectively in their surfaces, and can hold the liquid crystal display cell 1 and the lenticular lens 2 by adsorbing the glass substrate 3A and the protective film 200 of the lenticular lens 2. This adsorbing operation is carried out by means of a negative pressure generated from a negative pressure source (not shown).

The substrate and lens holding stages 11 and 12 can be freely driven in two directions, i.e., horizontal and vertical directions, and also a rotational direction by a driving mechanism 13 provided as driving means having a servo motor or the like (not shown) based on control at the control unit 40.

As shown in FIG. 1, the measuring unit 20 includes a first observation system (first observing means) 21 provided to detect deviation between the liquid crystal display cell 1 and the lenticular lens 2 in the rotational direction, and a second observation system (second observing means) 22 provided to detect deviation between the liquid crystal display cell 1 and the lenticular lens 2 in the horizontal direction (direction of arraying the condenser lens portions 7 side by side).

Each of the first and second observation systems 21 and 22 includes a microscope 23 provided as observing means capable of varying a depth of its focus, a CCD camera 24 provided as imaging means to pick up an image obtained by the microscope 23, and a monitor 25 provided to display the image picked up by the CCD camera 24. Regarding the arrangement of the second observation system 22, a pair of the systems having microscopes 23 and CCD cameras 24 are installed in one and the other end of the liquid crystal display cell 1.

The measuring unit 20 further includes an image processing unit 26 provided as position data obtaining means to process images picked up by the CCD cameras 24 of the first and second observation systems 21 and 22.

The light source 30 emits a quantity of light needed to obtain a specified image by each microscope 23 and each CCD camera 24. This light is emitted from the condenser lens portion 7 side (backside in FIG. 1) of the lenticular lens 2, and if possible, the light to be emitted should preferably be parallel rays of light.

Next, description will be made for a method of performing alignment for the liquid crystal display cell 1 and the lenticular lens 2 in the aligning apparatus constructed in the foregoing manner.

First, as shown in FIG. 2, the substrate holding stage 11 adsorbs the glass substrate 3A of the liquid crystal display cell 1, and the lens holding stage 12 adsorbs the protective film 200 of the lenticular lens 2. Accordingly, the liquid crystal display cell 1 and the lenticular lens 2 laminated by interpolating the unhardened adhesive 100 are held by the stage unit 10.

Then, a light generated from the light source 30 is emitted from the lenticular lens 2.

Figure 3:
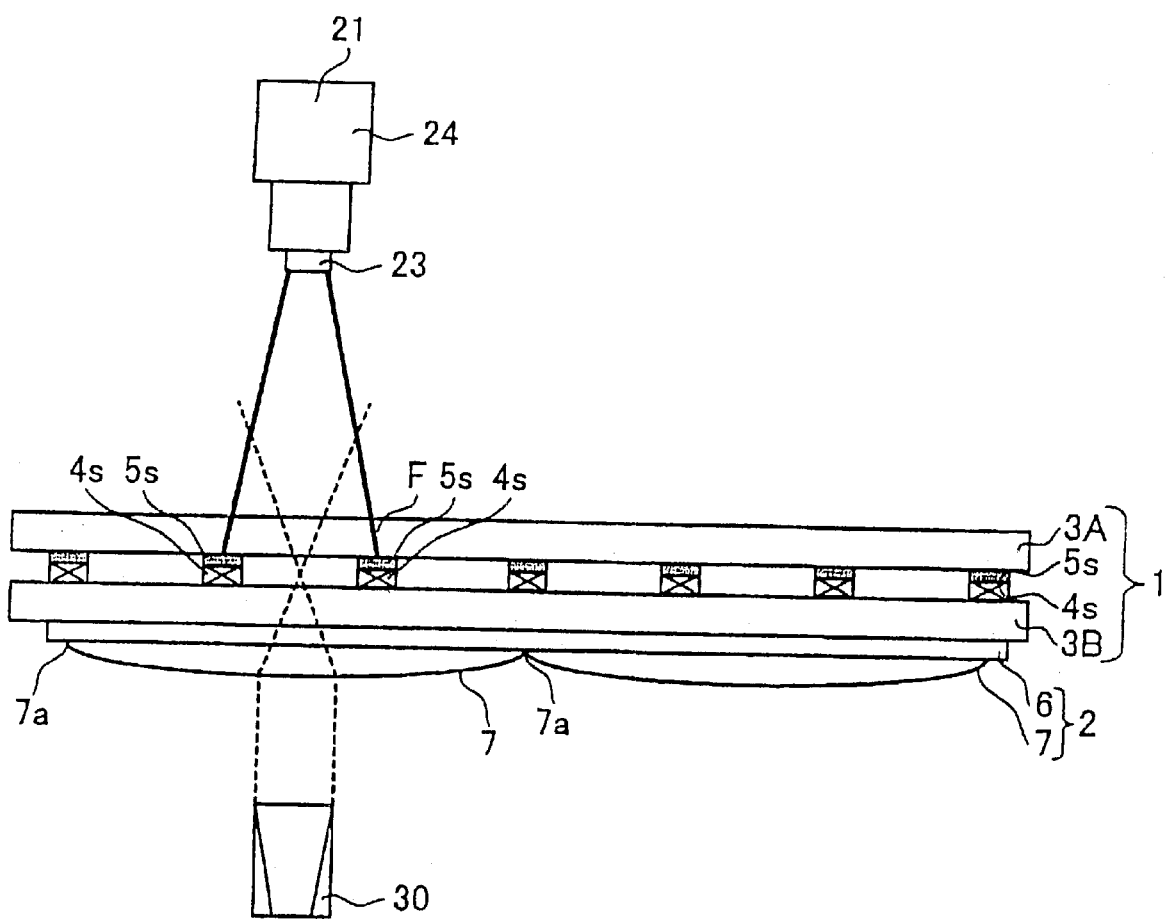
FIG. 3 is a view showing a set state of a focus of a microscope to a liquid crystal display cell according to a first embodiment.

In this state, first, as shown in FIG. 3, in the microscope 23 of the first observation system 21, its observation focus F is set to the signal line 4s or its corresponding black matrix 5s of the liquid crystal display cell 1 held by the stage unit 10. These signal line 4s and black matrix 5s are formed in a matrix shape, constituting the pattern, the wiring portion and the non-transmission portion of the liquid crystal display cell 1.

Figure 4:
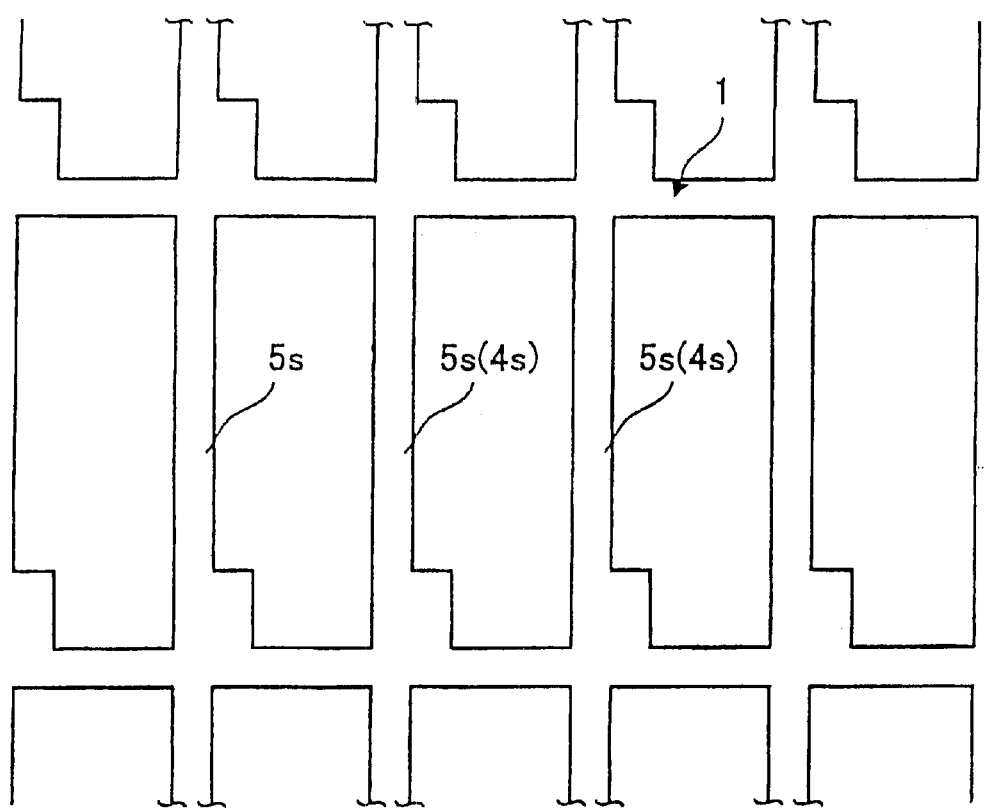
FIG. 4 is a view showing an image obtained in the state of FIG. 3.

FIG. 4 shows an example of an image obtained in the microscope 23 in the foregoing state.

Subsequently, based on the image (see FIG. 4) obtained from the microscope 23 by the CCD camera 24, in the image processing unit 26, one signal line 4s or black matrix 5s (simply referred to as "black matrix 5s", hereinafter) present within the range of the visual field of the microscope 23 is selected, and the position (coordinate) thereof in the horizontal direction is stored. In this case, since the black matrix 5s has a width of, e.g., 10 to 20 µm, in the image processing unit 26, the centerline of the black matrix 5s in the width direction is calculated, and its position is stored as data regarding the position of the black matrix 5s.

Figure 5:
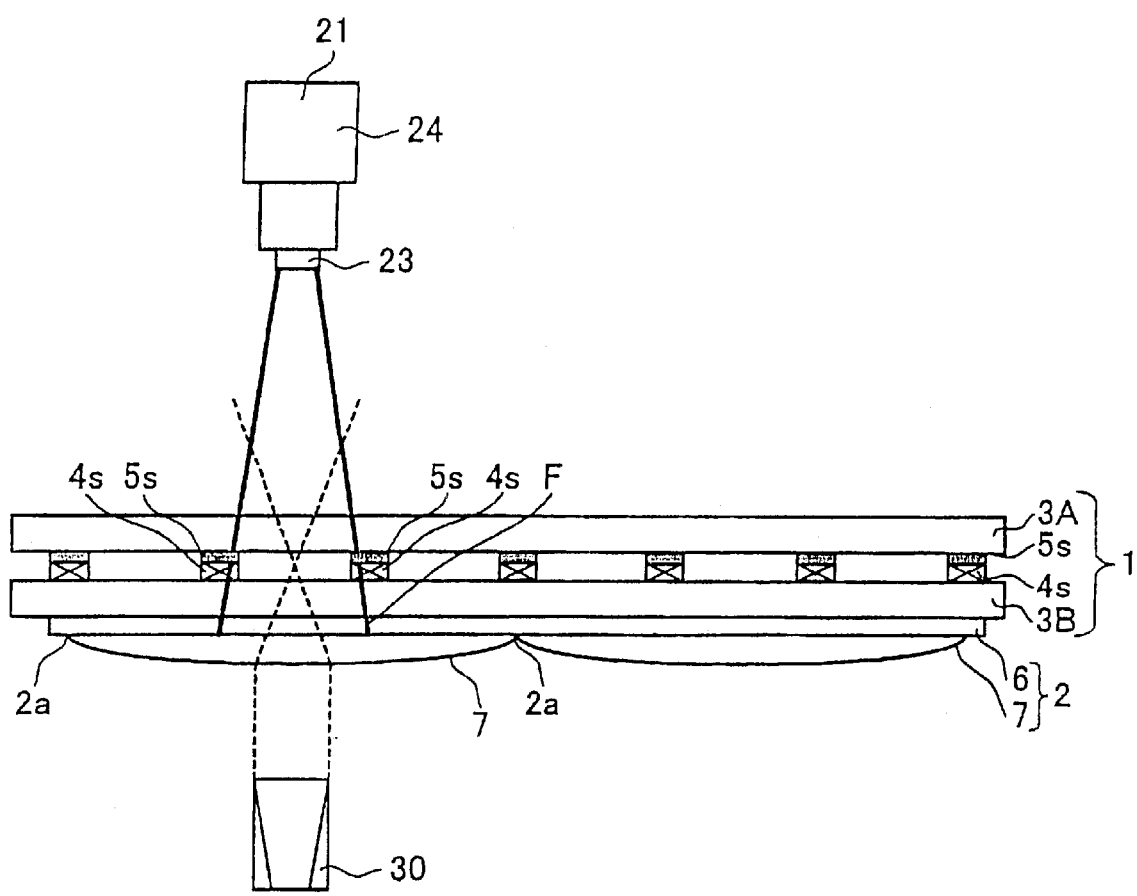
FIG. 5 is a view showing a set state of a focus of the microscope to a lenticular lens.

Then, as shown in FIG. 5, a depth of focus is changed for the microscope 23 of the first observation system 21 while fixing the position thereof, and a focus F for observation is set to the joint 7a (level thereof) of the condenser lens portion 7 of the lenticular lens 2 held by the stage unit 10.

Figure 6:
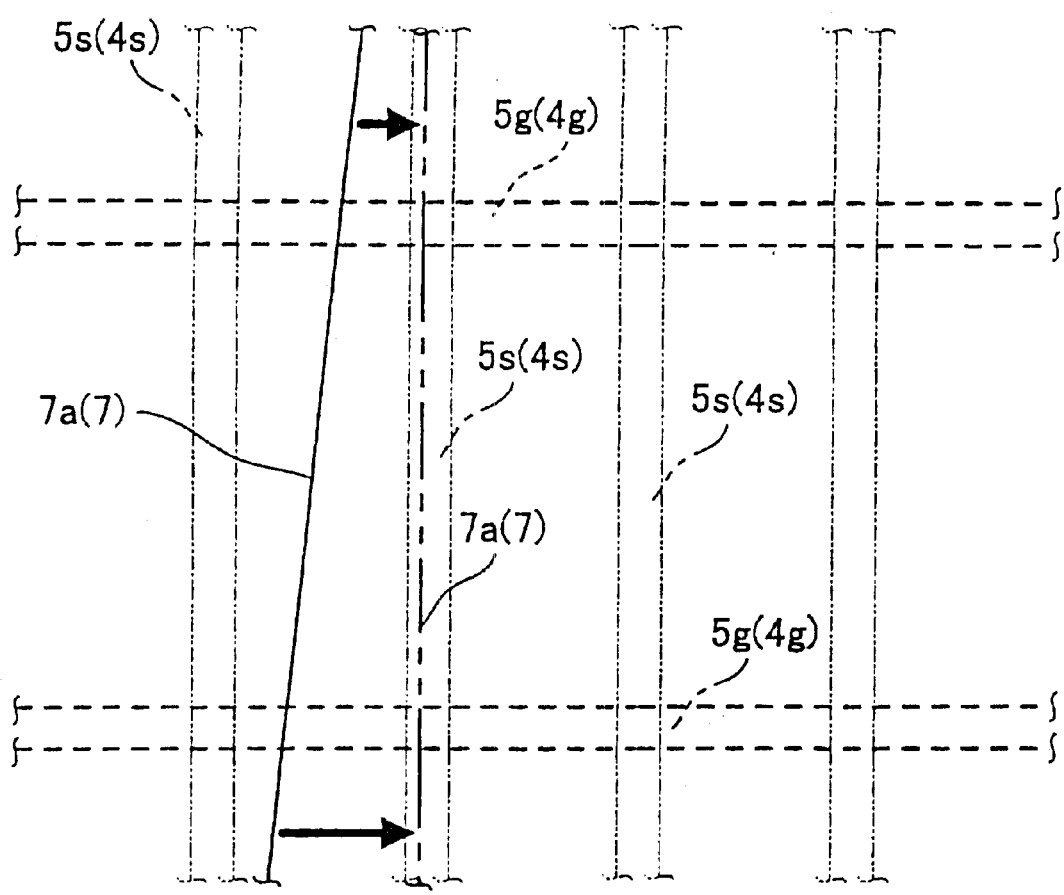
FIG. 6 is a view showing an image when deviation in a rotational direction is corrected in the state of FIG. 5.

FIG. 6 shows an example of an image obtained by the microscope 23 (and the CCD camera 24) in the foregoing state. Regarding the image obtained in this case, since the joint 7a of the condenser lens portion 7 cannot obtain a condensing effect similar to that obtained by the condenser lens portion 7, the joint 7a of the condenser lens portion 7 is darker compared with the condenser lens portion 7. In addition, opposite to the focused lenticular lens 2, in the microscope 23 side, the liquid crystal display cell 1 is present. However, since a light from the light source 30 sneaks to the signal line 4s of the liquid crystal display cell 1 and the black matrix 5s covering the same (indicated by a 2-dotted chain line in FIG. 6) because of the condensing effect of the condenser lens portion 7, an image obtained by the microscope 23 becomes bright, resulting in the impossibility of observation (alternatively, only a blurred image is obtained). On the other hand, a gate line 4g and a black matrix 5g covering the same are positioned to cross the bending direction of the condenser lens portion 7. Hence, a light from the light source 30 is intercepted irrespective of the condensing effect of the condenser lens portion 7, and the image obtained by the microscope 23 thus becomes dark to be observed.

Therefore, if a focus F for observation of the microscope 23 is set to the joint 7a of the condenser lens portion 7 of the lenticular lens 2, only the joint 7a of the condenser lens portion 7 and the black matrix 5g covering the gate line 4g extended in the horizontal direction (direction of the arrayed condenser lens portions 7) can be observed as dark places. In this case, since the joint 7a of the condenser lens portion 7 of the lenticular lens 2 has a width of, e.g., 1 µm, sufficient accuracy can be obtained without calculating a centerline like the case of the black matrix 5s.

Then, in the state where the observation focus F of the microscope 23 is set to the joint 7a of the condenser lens portion 7 of the lenticular lens 2, and based on the image (see FIG. 6) obtained from the microscope 23 by the CCD camera 24, in the image processing unit 26, given one joint 7a is selected, and a position coordinate thereof in the horizontal direction is stored as position data.

As a result, it is possible to obtain data regarding the horizontal position of given one black matrix 5s of the liquid crystal display cell 1 and the horizontal position of the joint 7a of the condenser lens portion 7 of the lenticular lens 2 at a first point (position indicated by a code A in FIG. 1).

Then, the substrate holding stage 11 and the lens holding stage 12 are both moved by specified dimensions in the vertical direction by means of driving of the driving mechanism 13. Accordingly, the liquid crystal display cell 1 and the lenticular lens 2 are moved by specified dimensions in the vertical direction relative to the microscope 23 of the first observation system 21 while keeping a positional relation therebetween.

Subsequently, at a second point (point indicated by a code B in FIG. 1), similarly to the foregoing case, as shown in FIG. 3, the observation focus F of the microscope 23 of the first observation system 21 is set to the black matrix 5s of the liquid crystal display cell 1. Then, based on the image obtained from the microscope 23 by the CCD camera 24, in the image processing unit 26, the centerline of the same black matrix 5s, the position thereof having been stored in the foregoing, is calculated, and a position coordinate thereof in the horizontal direction is stored.

Subsequently, as shown in FIG. 5, a depth of focus of the microscope 23 is changed, and its observation focus F is set to the joint 7a of the condenser lens portion 7 of the lenticular lens 2. Then, based on the image obtained from the microscope 23 by the CCD camera 24, in the image processing unit 26, a position coordinate of the same joint 7a in the horizontal direction, the position thereof having been stored in the foregoing, is stored.

Figure 7:
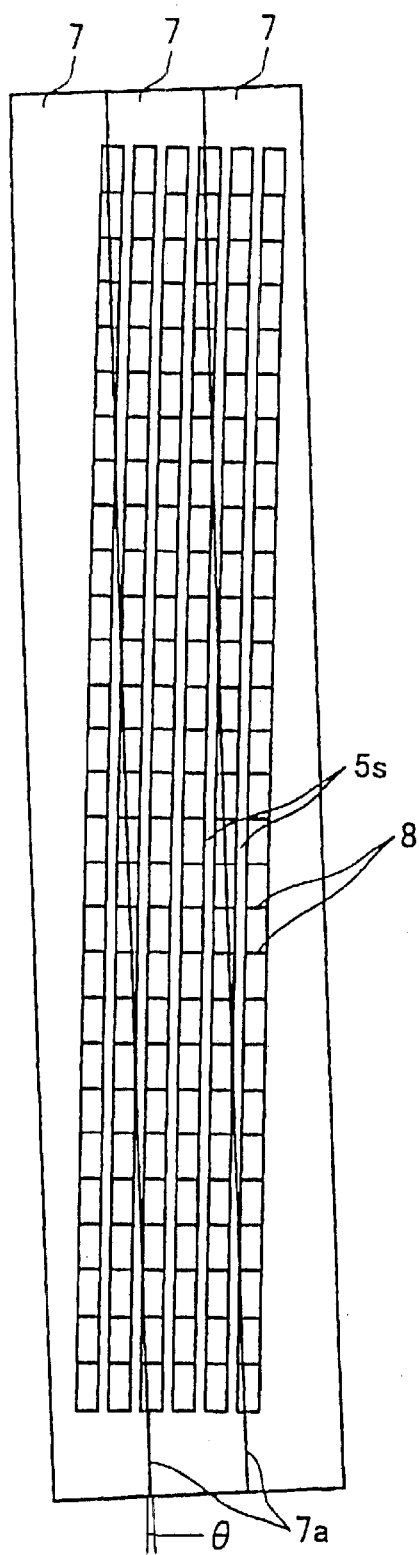
FIG. 7 is a view showing a deviated state of the liquid crystal display cell and the lenticular lens in the rotational direction.

Thus, regarding the same black matrix 5s and the same joint 7a of the condenser lens portion 7, the position coordinates of two points (points indicated by the codes A and B in FIG. 1) spaced from each other by a specified distance are obtained. As a result, as shown in FIG. 7, it is possible to obtain a deviation angle θ in the rotational direction between the liquid crystal display cell 1 and the lenticular lens 2.

Thereafter, in the control unit 40, based on the obtained deviation angle q in the rotational direction, the quantity of rotation for each of the substrate and lens holding stages 11 and 12 of the state unit 10 is decided. Then, based on the decided quantity of rotation, any one or both of the substrate and lens holding stages 11 and 12 are rotated by the driving mechanism 13. In this way, as shown in FIG. 6, the black matrix 5s of the liquid crystal display cell 1 and the joint 7a of the condenser lens portion 7 of the lenticular lens 2 are set in parallel to each other, and the deviation in the rotational direction between the liquid crystal display cell 1 and the lenticular lens 2 is corrected. In FIG. 6, the joint 7a indicated by a solid line shows a state before correction, and the joint 7a indicated by a two-dotted chain line shows a state after correction. Herein, the joint 7a after correction is overlapped on the black matrix 5s. In this stage, however, since only the deviation in the rotational direction is corrected, the position of the joint 7a is not always overlapped on the black matrix 5s.

Figure 8:
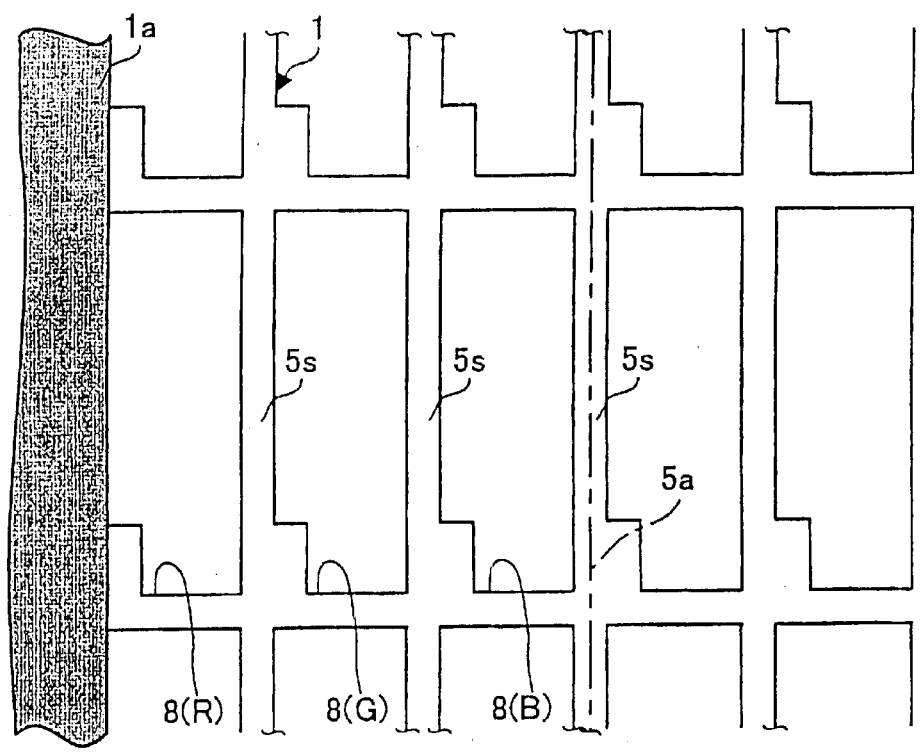
FIGS. 8(a) and 8(b) are views of images of the microscope when deviation in a horizontal direction between the liquid crystal display cell and the lenticular lens is corrected, specifically FIG. 8(a) showing an image focused on the liquid crystal display cell.
Figure 8:
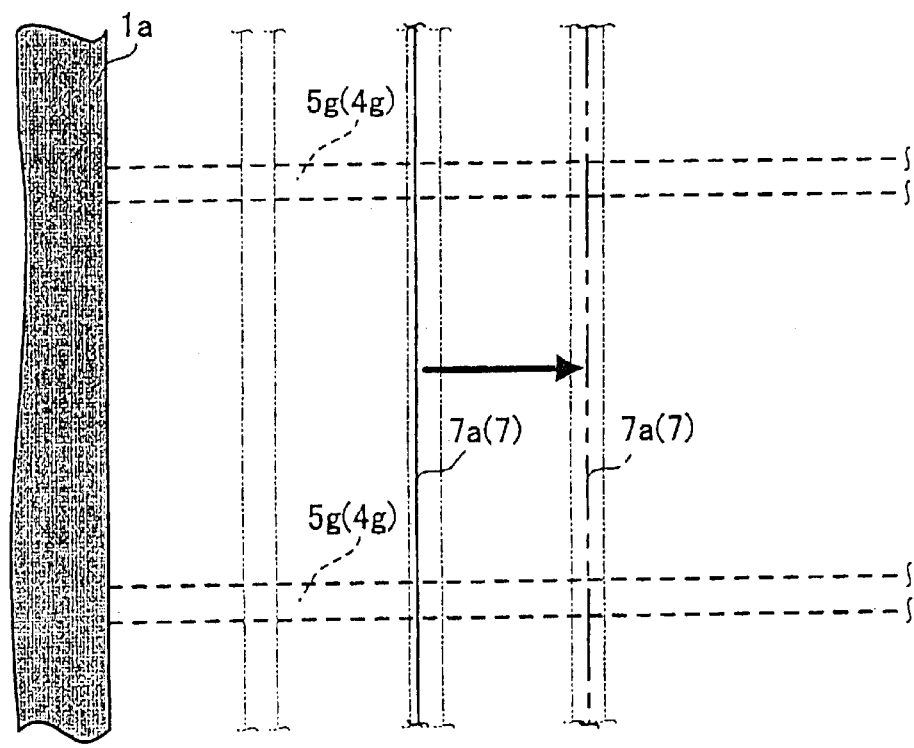

Then, horizontal alignment is performed for the liquid crystal display cell 1 and the lenticular lens 2. For this operation, at one of the pair of second observation systems 22 (point indicated by a code C in FIG. 1), as shown in FIG. 3, the observation focus F of the microscope 23 is set to the black matrix 5s of the liquid crystal display cell 1. In this case, the positions of the liquid crystal display cell 1 and the lenticular lens 2 are adjusted beforehand by means of driving of the stage unit 10 such that a frame 1a outside the display area of the liquid crystal display cell 1 can be within the range of the visual field of the microscope 23. FIG. 8(a) shows an example of an image obtained in such a state.

Subsequently, based on the image obtained from the microscope 23 by the CCD camera 24, the black matrix 5s is observed in the image processing unit 26. In this case, the simple observation of only the black matrix 5s does not enable identification to be made as to which of the colors R, G and B an opening portion 8 takes. However, identification can be made by using the frame 1a of the liquid crystal display cell 1 set within the range of the visual field as a reference. As a result, since the black matrix 5s (third from the frame 1a in FIG. 8(a)) to be positioned corresponding to the joint 7a of the condenser lens portion 7 of the lenticular lens 2 can be selected, the centerline 5a of the selected black matrix 5s in the width direction is calculated, and its position coordinate in the horizontal direction is stored as position data of the black matrix 5s.

Subsequently, similarly to the foregoing case, as shown in FIG. 5, a depth of focus of the microscope 23 is changed, and the observation focus F thereof is set to the joint 7a of the condenser lens portion 7 of the lenticular lens 2. FIG. 8(b) shows an image obtained in such a state. Based on the image (see FIG. 8(b)) obtained from the microscope 23 by the CCD camera 24, in the image processing unit 26, the position coordinate of the joint 7a in the horizontal direction is stored.

Accordingly, at one of the pair of second observation systems 22, the quantity of deviation in the horizontal direction between the joint 7a of the condenser lens portion 7 and the corresponding matrix 5s can be obtained.

In parallel with the above operation, at the remaining one of the pair of second observation systems 22 (point indicated by a code D in FIG. 1), similarly to the foregoing case, by performing position measurement while changing a depth of focus of the microscope 23, it is possible to obtain the quantity of deviation in the horizontal direction between the position of the black matrix 5s and the joint 7a of the condenser lens portion 7 by using the frame 1a of the liquid crystal display cell 1 set within the range of the visual field as a reference.

Thereafter, at the control unit 40, calculation is performed to obtain an average value among the quantities of deviation between the joints 7a of the condenser lens portions 7 and the black matrices 5s, which have been obtained at both of the pair of second observation systems 22, and this average value is set as the quantity of deviation in the horizontal direction between the liquid crystal display cell 1 and the lenticular lens 2. Then, by the driving mechanism 13 of the stage unit 10, any one or both of the substrate and lens holding stages 11 and 12 are moved in the horizontal direction, and the quantity of deviation in the horizontal direction is corrected. In this case, correction is performed by using a centerline CL (see FIG. 1) passing through the center of the display area of the liquid crystal display cell 1 and the lenticular lens 2 as a reference. Compared with correction performed by using one end portion of either the liquid crystal display cell 1 or the lenticular lens 2 as a reference, such correction based on the centerline as a reference enables the effect of a manufacturing error for the pitches of arraying the condenser lens portions 7 to be limited within ½ at the lenticular lens 2.

In the foregoing manner, the alignment between the liquid crystal display cell 1 and the lenticular lens 2 is completed in the aligning apparatus. Then, in next step, the adhesive 100 in an unhardened state is hardened by irradiating it with ultraviolet rays, and thus the liquid crystal display cell 1 and the lenticular lens 2, which constitute the display panel 1, are fixed.

As described above, by changing the depth of focus of the microscope 23, measurement can be performed for a positional relation between the liquid crystal display cell 1 and the lenticular lens 2. In this case, by measuring a relation between the position of the black matrix 5s of the liquid crystal display cell 1 and the position of the joint 7a of the condenser lens portion 7 of the lenticular lens 2, the liquid crystal display cell 1 and the lenticular lens 2 can be aligned with each other without forming any particular marks or planar areas needed for alignment in the conventional case. As a result, during the cutting of the lenticular lens 2 out of a web as a material therefor in the manufacturing process of the lenticular lens 2, it is possible to avoid any reductions in yield.

In addition, highly accurate alignment can be performed by aligning the centerline 5a of the black matrix 5s of the liquid crystal display cell 1 with the position of the joint 7a of the condenser lens portion 7 of the lenticular lens 2.

Next, description will be made for the case, as an example, of performing alignment between the lenticular lens and the glass substrate by changing a depth of focus of an observation lens after alignment performed between the lenticular lens and the glass substrate using parallel rays of light. In the description, portions like those in the first embodiment are denoted by like reference numerals, and explanation thereof will be omitted.

An aligning apparatus used in the second embodiment is basically similar to that of the first embodiment shown in FIG. 1. A different point is that the liquid crystal display cell 1 is irradiated with a reference light as a band-like light 300 from the light source 30.

The reference light from the light source 30 should preferably be parallel rays of light, and made incident from the direction orthogonal to the surface of the liquid crystal display cell 1. The reference light is set according to the condensing level or the like of the lenticular lens 2 such that the light can be condensed to be a band-like light 300 at the condenser lens portion 7 of the lenticular lens 2, and then projected to the liquid crystal display cell 1 by a width roughly equal to the opening portion 8 formed therein.

To perform alignment between the liquid crystal display cell 1 and the lenticular lens 2, first, deviation in the rotational direction is measured at the first observation system 21 shown in FIG. 1. For this measurement, as shown in FIG. 2, the liquid crystal display cell 1 and the lenticular lens 2 laminated by interpolating the unhardened adhesive 100 are adsorbed and held by the substrate and lens holding stages 11 and 12 of the stage unit 10 beforehand.

Then, parallel rays of light are made incident from the lenticular lens 2 side by the light source 30 of the first observation system 21. Then, the parallel rays of light are condensed at each condenser lens portion 7, becoming a band-like light 300 extended in the continuous direction of the condenser lens portion 7, and then an image is formed at the liquid crystal display cell 1.

Figure 9:
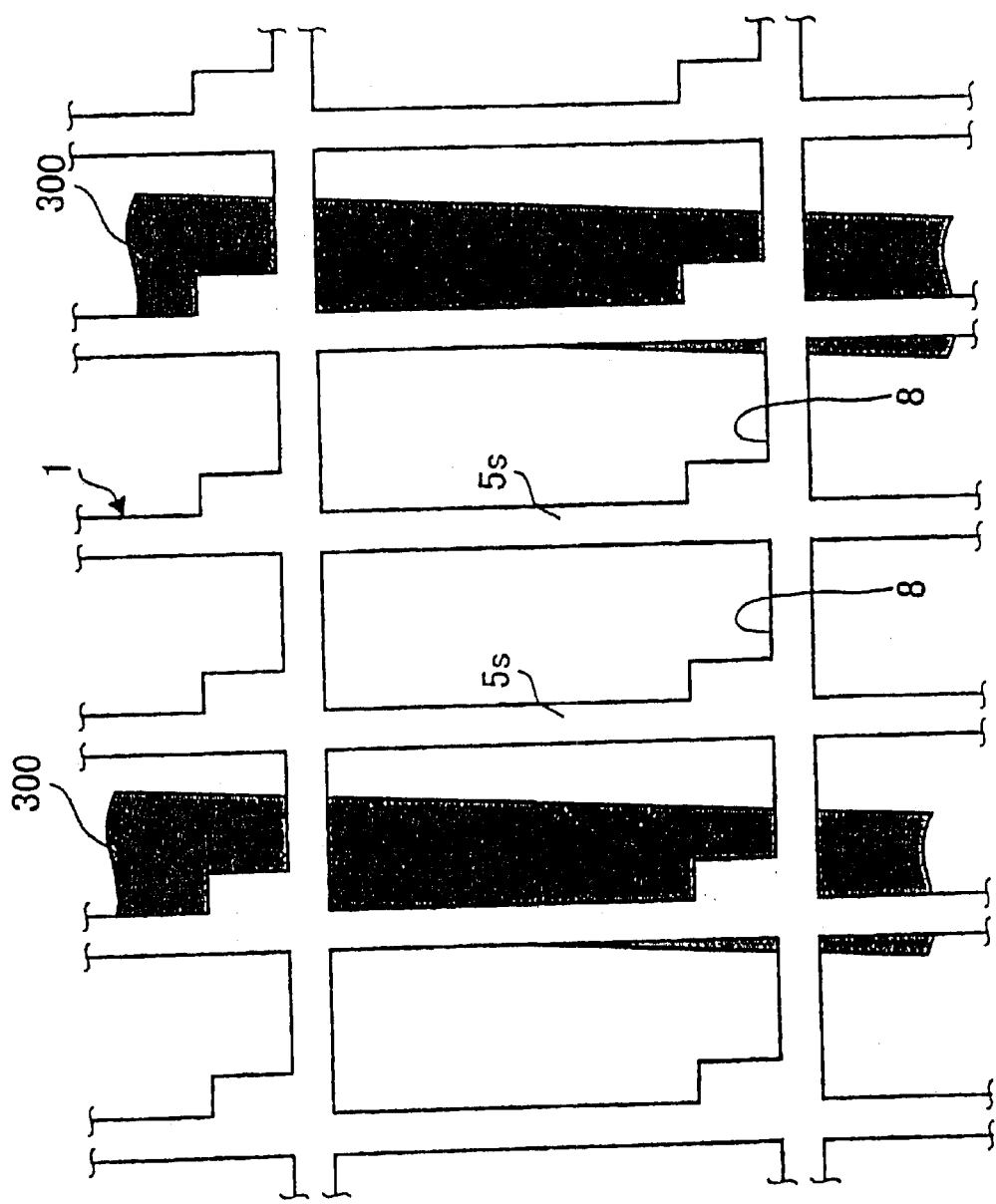
FIG. 9 is a view showing an image obtained in a set state of a focus of a microscope on a liquid crystal display cell while projecting parallel rays of light according to a second embodiment.

In this state, as shown in FIG. 3, at the microscope 23 of the first observation system 21 of the measuring unit 20, the observation focus F thereof is set to the black matrix 5s of the liquid crystal display cell 1 held by the stage unit 10, and its image is observed. FIG. 9 shows an example of an image obtained at the microscope 23 in such a state.

Subsequently, based on the image (see FIG. 9) obtained from the microscope 23 by the CCD camera 24, in the image processing unit 26, the position in the horizontal direction of the light 300 becoming band-like within the range of the visual field is stored, one black matrix 5s is selected, its centerline is calculated, and a position coordinate thereof in the horizontal direction is stored.

Accordingly, data is obtained, regarding positional deviation in the horizontal direction between given one black matrix 5s of the liquid crystal display cell 1 and the band-like light 300 at the first point (point indicated by the code A in FIG. 1).

Then, the substrate and lens holding stages 11 and 12 are both moved by specified dimensions in the vertical direction by means of driving of the driving mechanism 13. Accordingly, the liquid crystal display cell 1 and the lenticular lens 2 are moved by specified dimensions in the vertical direction relative to the microscope 23 of the first observation system 21 while keeping a positional relation therebetween.

Thereafter, at the second point (point indicated by the code B in FIG. 1), similarly to the foregoing case, based on the image obtained at the microscope 23 of the first observation system 21, in the image processing unit 26, data regarding the horizontal positions of given one black matrix 5s of the liquid crystal display cell 1 and the band-like light 300 is obtained.

In the foregoing manner, for the same black matrix 5s and the band-like light 300, the positions of the two points (points indicated by the codes A and B in FIG. 1) spaced from each other by a specified distance are obtained. Therefore, as shown in FIG. 7, a deviation angle θ in the rotational direction between the liquid crystal display cell 1 and the lenticular lens 2 is obtained.

Figure 10:
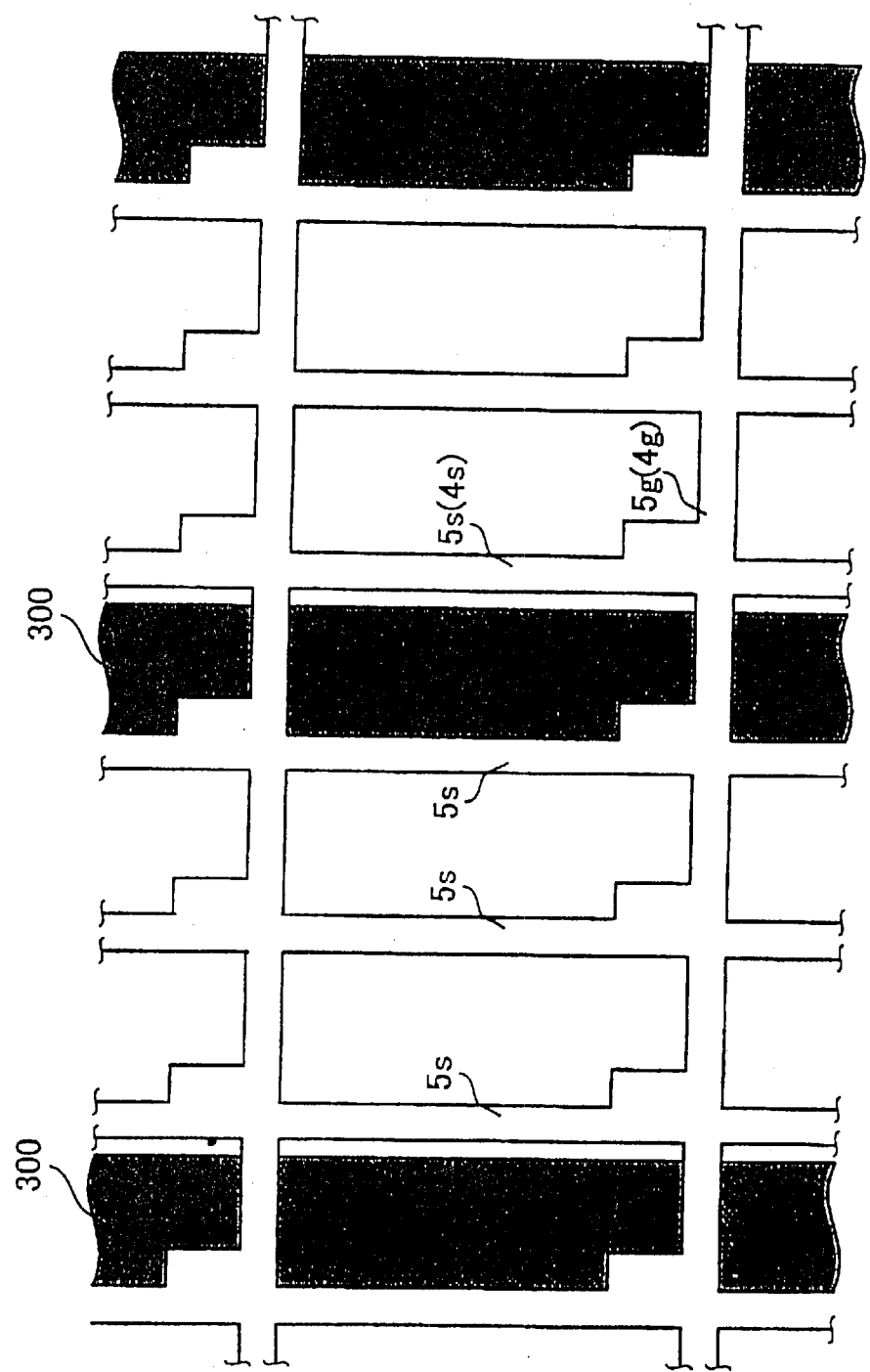
FIG. 10 is a view showing an image obtained after correction of the liquid crystal display cell in a rotational direction by using the parallel rays of light as a reference.

Thereafter, at the control unit 40, based on the obtained deviation angle q in the rotational direction, the quantity of rotation for each of the substrate and lens holding stages 11 and 12 of the stage unit 10 is decided. Based on the decided quantity of rotation, any one or both of the substrate and lens holding stages 11 and 12 are rotated by the driving mechanism 13. Thus, as shown in FIG. 10, the black matrix 5s of the liquid crystal display cell 1 and the band-like light 300 are corrected to be parallel to each other. In this case, since the band-like light 300 is a result of condensing performed by the condenser lens portion 7 of the lenticular lens 2, the correction of the deviation in the rotational direction between the band-like light 300 and the liquid crystal display cell 1 also means correction of deviation in the rotational direction between the lenticular lens 2 and the liquid crystal display cell 1.

Figure 11:
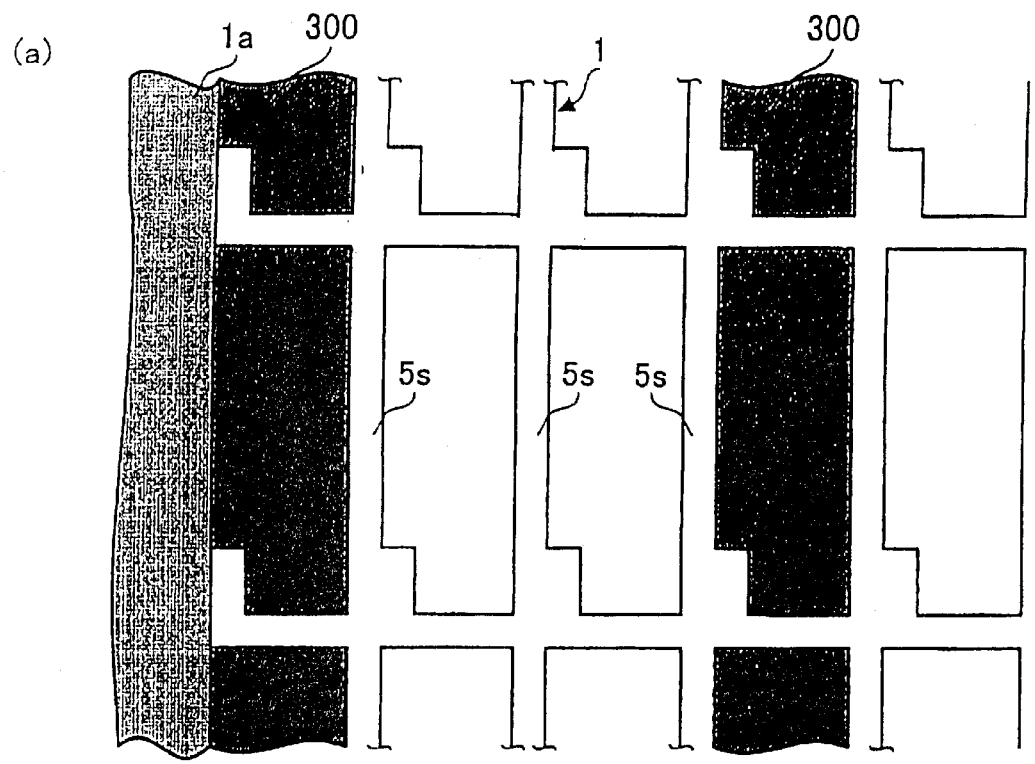
FIGS. 11(a) and 11(b) are views of images of the microscope when deviation in a horizontal direction between the liquid crystal display cell and a lenticular lens is corrected, specifically FIG. 11(a) showing an image focused on the liquid crystal display cell.
Figure 11:
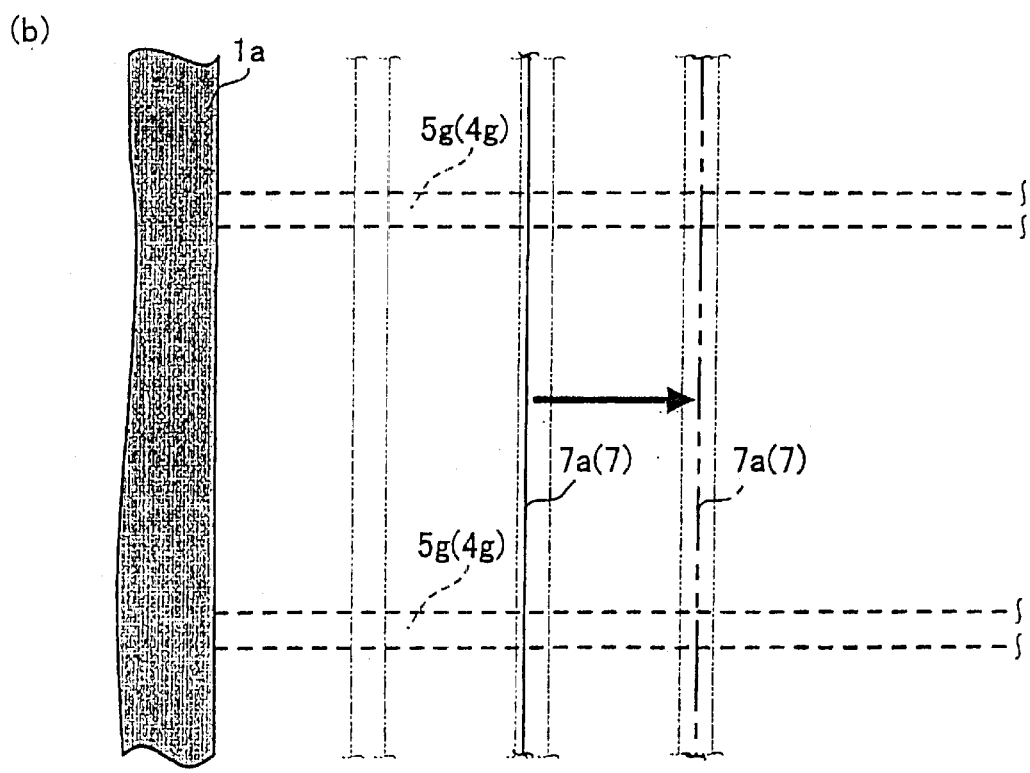

Then, horizontal alignment is performed between the liquid crystal display cell 1 and the lenticular lens 2. For this operation, as in the case of the first embodiment, at each of the pair of second observation systems 22, the positions of the liquid crystal display cell 1 and the lenticular lens 2 are adjusted by means of driving of the stage unit 10 beforehand such that the frame 1a of the liquid crystal display cell 1 can be set within the range of the visual field of the microscope 23. Then, the observation focus F of the microscope 23 is set to the black matrix 5s of the liquid crystal display cell 1, and the position of the black matrix 5s using the frame 1a of the liquid crystal displace cell 1 set within the range of the visual field as a reference is stored. FIG. 11(a) shows an image obtained in such a state.

Subsequently, similarly to the foregoing case, as shown in FIG. 5, a depth of focus of the microscope 23 is changed, and its observation focus F is set to the joint 7a of the condenser lens portion 7.

FIG. 11(b) shows an example of an image obtained in the above state. Regarding the image obtained in this case, at the signal line 4s of the liquid crystal display cell 1 and the black matrix 5s covering the same, since the light 300 from the light source 30 sneaks thereto because of the condensing effect of the condenser lens portion 7, an image obtained by the microscope 23 becomes bright. Only the joint 7a of the condenser lens portion 7, the gate line 4g extended in the horizontal direction (direction of the arrayed condenser lens portions 7), and the black matrix 5g covering the same are observed as dark places.

Then, based on the image (see FIG. 11(b)) obtained from the microscope 23 by the CCD camera 24, in the image processing unit 26, the position coordinate of the joint 7a in the horizontal direction is stored.

Accordingly, at each of the pair of second observation systems 22, the quantity of deviation in the horizontal direction between the joint 7a of the condenser lens portion 7 and its corresponding black matrix 5s is obtained. Then, at the control unit 40, calculation is made for an average value among the quantities of deviation between the joints 7a of the condenser lens portions 7 and the black matrix 5s at both of the pair of second observation systems 22, and the obtained average value is set as the quantity of deviation in the horizontal direction between the liquid crystal display cell 1 and the lenticular lens 2. Then, any one or both of the substrate and lens holding stages 11 and 12 of the stage unit 10 are moved in the horizontal direction by the driving mechanism 13, and thus the quantity of deviation in the horizontal direction is corrected. In this case, correction is performed by using the centerline CL in the horizontal direction of the liquid crystal display cell 1 and the lenticular lens 2 as a reference.

In the foregoing manner, the alignment between the liquid crystal display cell 1 and the lenticular lens 2 is completed in the aligning apparatus. Then, in next step, the unhardened adhesive 100 is irradiated with ultraviolet rays to be hardened, and the liquid crystal display cell 1 and the lenticular lens 2, which constitute the display panel are accordingly fixed.

As described above, for the horizontal alignment between the liquid crystal display cell 1 and the lenticular lens 2, as in the first embodiment, a depth of focus of the microscope 23 is changed, and measurement is performed for the positions of the black matrix 5s of the liquid crystal display cell 1 and the joint 7a of the condenser lens portion 7 of the lenticular lens 2. In this way, highly accurate alignment can be performed. In addition, the necessity of forming particular marks or planar areas for alignment can be eliminated, and it is possible to avoid any reductions in yield in the manufacturing process of the lenticular lens 2.

Further, prior to the horizontal alignment between the liquid crystal display cell 1 and the lenticular lens 2, by irradiating the lenticular lens 2 with parallel rays of light from the light source 30, an image of the band-like light 300 is formed on the liquid crystal display cell 1, and deviation in the rotational direction is corrected between the band-like light 300 and the black matrix 5s. Thus, by performing alignment based on the joint 7a of the condenser lens portion 7 of the lenticular lens 2 as a reference after the alignment performed based on the band-like light 300 as a reference, it is possible to easily and surely align the liquid crystal display cell 1 and the lenticular lens 2 with each other with high accuracy.

In the first and second embodiments, for the horizontal alignment performed between the liquid crystal display cell 1 and the lenticular lens 2, the black matrix 5s is specified by using the frame 1a of the liquid crystal display cell 1 as a reference. Other than this, if the black matrix 5s can be specified by using other reference, such as a leader line or the like for voltage application, position measurement/correction is not always necessary at the second observation system 22, and it is possible to perform correction for horizontal deviation simultaneously with the correction of rotational deviation performed at the first observation system 21.

In each of the foregoing embodiments, totally three observation systems (microscopes 23), i.e., the first observation system 21 and the pair of second observation systems 22, are provided. However, only a pair of observation systems maybe provided and, by moving the liquid crystal display cell 1 and the lenticular lens 2 relative to the microscope 23 on the stage unit 10, position measurement may be performed for each place.

In addition, if a required resolution can be obtained at the microscope 23, position measurement may be performed for a plurality of places within the range of the visual field of one microscope 23 and, based on the result of such measurement, deviation in the rotational and horizontal directions between the liquid crystal display cell 1 and the lenticular lens 2 can be corrected.

Further, in each of the foregoing embodiments, position measurement is performed for the signal line 4s of the liquid crystal display cell 1 or the black matrix 5s covering the same. However, the position measurement can be performed for the gate line 4g, the black matrix 5g covering the same or the opening portion 8.

Still further, in each of the foregoing embodiments, totally three opening portions 8 (pixels), i.e., R, G and B, are provided, each of which corresponds to each condenser lens portion 7 of the lenticular lens 2. However, for example, even if only one opening portion 8 is provided corresponding to the condenser lens portion 7, the present invention can be applied as in the foregoing case. In such a case, different from the case of each of the embodiments, correspondence with the opening portions 8 of R, G and B is not necessary, and thus the correction of horizontal deviation may be performed simultaneously with the correction of rotational deviation. Also, in such a case, a light is projected from the liquid crystal display cell side, and observation thereof can be performed at the lenticular lens side.

Each of the embodiments has been described by taking the example of the liquid crystal display cell 1 and the lenticular lens 2 as objects for alignment. Other than this, the present invention can be applied to alignment, for example, between a glass substrate having a specified pattern of other circuit or the like formed thereon and a lens sheet having a lens portion. Thus, there should be no limitation placed on objects for alignment.

In addition, application of the lenticular lens 2 is not limited to the foregoing liquid crystal display having no color filters. The lenticular lens 2 may be used in combination of color filters in a projection type liquid crystal display device, and rays of light condensed at the lenticular lens 2 may be converged at the pixel opening portion 8 of the liquid crystal display cell 1, thus increasing the quantity of transmitted light. Also, in such a case, as in the case of the embodiments, alignment between the lenticular lens 2 and the liquid crystal cell 1 can be performed.

As apparent from the foregoing, according to the present invention, it is possible to perform highly accurate alignment between the lens sheet and the glass substrate easily and surely, and to prevent any reductions in yield in the lens manufacturing process.

Having thus described our invention, what we claim as new and desire to Secure by Letters Patent is:

1. A method of alignment between a first sheet material having a specified pattern formed thereon and made of a transmissive material, the first sheet material being a liquid crystal display cell including, as the specified pattern, signal and gate lines and a black matrix covering these lines disposed in a matrix shape;

and a second sheet material laminated on the first sheet material, comprising the steps of:

setting a focus of a microscope disposed on the first sheet material side on the first sheet material in a laminated state of the first and second sheet materials to perform measurement for a position of a specified portion of the first sheet material, said measurement being performed for a position of the liquid crystal display cell based on one selected from the signal line, the gate line and the black matrix;

setting the focus of the microscope on the second sheet material to perform measurement for a position of a specified portion of the second sheet material; and performing alignment between the first and second sheet materials based on the measured positions of the first and second sheet materials.

2. The method of alignment between sheet materials according to claim 1, wherein the second sheet is a lens sheet including a plurality of lens portions arrayed thereon, and measurement is performed for a position of the lens sheet at a joint of the lens portions adjacent to each other.

3. The method of alignment between sheet materials according to claim 1, wherein the measurements for the positions of the first and second sheet materials are performed at a plurality of places, and alignment is performed between the first and second sheet materials based on the positions of the first and second sheet materials measured at the respective places.

4. A method of alignment between a glass substrate having a non-transmission portion transmitting no lights and a lens sheet laminated on the glass substrate, comprising the steps of:

making reference light incident on the glass substrate and the lens sheet laminated together from the lens sheet side; and aligning the glass substrate relative to the reference light passing through the lens sheet, wherein the reference light is condensed at the lens sheet and projected to the glass substrate as a light in the form of a band.

5. The method of alignment according to claim 4, wherein alignment is performed for the glass substrate by aligning the non-transmission portion of the glass substrate relative to the reference light.

6. The method of alignment according to claim 4, wherein the reference light is parallel rays of light.

7. The method of alignment according to claim 6, wherein the reference light is made incident on the glass substrate from a direction substantially orthogonal to the same.

8. A method of alignment comprising:

a first step of making parallel rays of light incident from a lenticular lens side on a liquid crystal display cell having a wiring portion, and the lenticular lens having a plurality of arrayed condenser lenses extending in one direction to align the liquid crystal display cell relative to band-like reference light obtained by condensing the parallel rays of light at the condenser lenses;

a second step of performing measurement for a position of the wiring portion of the liquid crystal display cell by observing means after a focus of the observing means disposed on the liquid crystal display cell side is set on the liquid crystal display cell, and performing measurement for a position of a joint of the condenser lenses by the observing means after the focus of the observing means is set on the lenticular lens; and a third step of performing alignment between the liquid crystal display cell and the lenticular lens based on the measured positions of the wiring portion and the joint of the condenser lenses.

9. The method of alignment according to claim 8, wherein in the second step, deviation of the liquid crystal display cell in a rotational direction relative to the reference light is corrected, and in the third step, deviation between the lenticular lens and the liquid crystal display cell in a direction orthogonal to the extended direction of the condenser lens is corrected.

10. The method of alignment according to claim 8, wherein in the second step, for the measurement of the position of the wiring portion, a position of the wiring portion in a centerline of a width direction is measured.

11. The method of alignment according to claim 8, wherein measurement is performed for a position of the wiring portion specified by using a frame outside a display area of the liquid crystal display cell as a reference.

12. The method of alignment according to claim 8, wherein in the second step, the positions of the wiring portion and the joint of the condenser lenses are respectively measured at two places spaced from each other with a centerline of the liquid crystal display cell held therebetween, and in the third step, alignment is performed between the liquid crystal display cell and the lenticular lens based on results of the position measurement at the two places and by using the centerline of the liquid crystal display cell as a reference.

13. An aligning apparatus comprising:

cell holding means for holding a liquid crystal display cell;

lens holding means for holding a lenticular lens laminated on the liquid crystal display cell;

driving means for driving at least one of the cell and lens holding means within a surface along a surface of the liquid crystal display cell;

observing means disposed opposite the liquid crystal display cell and capable of changing a depth of focus thereof, the observing means including first observing means for measuring deviation between the liquid crystal display cell and the lenticular lens in a rotational direction, and second observing means for measuring deviation between the liquid crystal display cell and the lenticular lens in a direction orthogonal to a continuous direction of a lens portion provided in the lenticular lens;

position data obtaining means for obtaining position data of the liquid crystal display cell and the lenticular lens based on an image obtained by the observing means; and control means for controlling the driving means based on the position data obtained by the position data obtaining means.

14. The aligning apparatus according to claim 13, further comprising a light source for emitting parallel rays of light to the lenticular lens held by the lens holding means.

15. The aligning apparatus according to claim 13, wherein the second observing means are disposed on one and other end portions of the liquid crystal display cell, the second observing means being spaced from each other by a specified distance in a direction orthogonal to the continuous direction of the lens portion.

* * * * *